(12) United States Patent
Lee

(10) Patent No.: US 7,446,484 B2
(45) Date of Patent: Nov. 4, 2008

(54) MIDDLE OUTPUT ELECTRODELESS LIGHTING SYSTEM

(75) Inventor: Ji-Young Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/538,269

(22) Filed: Oct. 3, 2006

(65) Prior Publication Data

US 2007/0085490 A1   Apr. 19, 2007

(30) Foreign Application Priority Data

Oct. 7, 2005   (KR) .................. 10-2005-0094487

(51) Int. Cl.
*H05B 41/16*   (2006.01)
(52) U.S. Cl. ............... 315/248; 315/39.69; 315/39.65; 315/39.51
(58) Field of Classification Search ............... 315/248, 315/39.51, 39.53, 39.65, 39.69
See application file for complete search history.

(56) References Cited

U.S. PATENT DOCUMENTS

| 7,129,639 B2 | 10/2006 | Kim et al. |
| 2005/0047139 A1 * | 3/2005 | Seo ........................... 362/263 |
| 2005/0062426 A1 * | 3/2005 | Hu ............................. 315/39 |
| 2005/0122049 A1 | 6/2005 | Lee et al. |
| 2005/0128750 A1 | 6/2005 | Choi et al. |
| 2006/0066244 A1 | 3/2006 | Choi et al. |
| 2006/0087257 A1 | 4/2006 | Choi et al. |

FOREIGN PATENT DOCUMENTS

KR   10-2003 0075116   9/2003

OTHER PUBLICATIONS

English Language Abstract of KR 10-2003-0075116.

* cited by examiner

*Primary Examiner*—Tuyet Vo
(74) *Attorney, Agent, or Firm*—Greenblum & Bernstein, P.L.C.

(57) ABSTRACT

A middle output electrodeless lighting system comprising: a resonator having a certain inner space and adapted to form a resonance mode by shielding a discharge of microwaves applied therein to the exterior and to allow a discharge of light generated to the exterior; an electrodeless bulb including a light emitting portion positioned in the inner space of the resonator to emit (generate) light upon plasmarizing light emitting materials filled therein by the microwaves applied to the resonator, and a supporting member to support the light emitting portion thus to allow the light emitting portion to be arranged up to a certain height in the inner space of the resonator; and an initial lighting unit disposed at one side of the inner space of the resonator to enhance concentration of microwaves toward the electrodeless bulb so as to stabilize an initial lighting of the electrodeless bulb.

8 Claims, 5 Drawing Sheets

MIDDLE OUTPUT ELECTRODELESS LIGHTING SYSTEM

RELATED APPLICATION

The present disclosure relates to a subject matter contained in priority Korean Application No. 10-2005-0094487, filed on Oct. 7, 2005, which is herein expressly incorporated by reference in its entirety.

BACKGROUND OF THE INVENTION

1. Field of the Invention

The present invention relates to a middle output electrodeless lighting system, and more particularly a middle output electrodeless lighting system capable of increasing luminous efficiency by facilitating or stabilizing an initial lighting of an electrodeless bulb when operating a middle output electrodeless lighting system.

2. Background of the Invention

FIG. 1 is a sectional view illustrating a structure of a related art middle output electrodeless lighting system, and FIG. 2 is a sectional view illustrating a structure in which an electrodeless bulb is disposed in a resonator of FIG. 1.

As illustrated therein, a related art middle output electrodeless lighting system comprises a casing 10 having a certain inner space, a high voltage generator 20 disposed at one side of the inner space of the casing 10 to generate a high voltage when power is applied, a microwave generator 30 to oscillate microwaves having a high frequency when the high voltage generated from the high voltage generator 20 is applied, a wave guide 40 to guide the microwaves applied from the microwave generator 30, a resonator 50 installed at an outside of the casing 10 to shield a discharge of the microwaves guided by the wave guide 40 to thus form a resonance mode, and an electrodeless bulb 60 rotatably disposed in the center of the resonator 50 to emit light by plasmarizing inactive gases filled therein in the resonance mode.

The wave guide 40 is formed in a cylindrical tube, one side surface of the wave guide 40 connected to the microwave generator 30. A resonator coupling member 41 which has a particular height is protruded from an upper surface of the wave guide 40 along a height (longitudinal) direction of the wave guide 40.

The resonator coupling member 41 is formed in a ring (annular) shape having a diameter smaller than that of the wave guide 40, and its center is penetrated. An outer side surface of the resonator coupling member 41 is fixedly coupled to the resonator 50.

The resonator 50 is implemented in a shape of a cylindrical mesh having a net-like structure such that the electrodeless bulb 60 is received in its inner space, microwaves are shielded from being discharged to the outside thus to be delivered to the electrodeless bulb 60, and light emitted from the electrodeless bulb 60 is transmitted to the outside. An outer shape of the resonator 50 is formed of a steel material to maintain its cylindrical shape, A mirror 70 is formed in a circular plate having the same diameter as that of the resonator coupling member 41 and is in contact with an upper end of the resonator coupling member 41 The electrodeless bulb 60 having a certain length is extended from the center portion of the mirror 70 in a height (longitudinal) direction of the wave guide 40 to thus be exposed out of the wave guide 40.

The electrodeless bulb 60, on the other hand, comprises a spherical light emitting portion 61 having a certain inner volume for filling a filling material, and a fixing portion 62 formed of the same material as that of the light emitting portion 51 and extended from the light emitting portion 61.

The light emitting portion 61 is installed inside the resonator 50 and the fixing portion 62 is installed to be formed into the center portion of the wave guide 40. The fixing portion 62 installed is connected to a motor shaft of a driving motor 90 which is installed in the casing 10 thus to be rotated at a certain speed.

The light emitting portion 61 is preferably fabricated using a material such as quartz which has a high optical transmittance and an extremely low dielectric loss. The filling material filled in the light emitting portion 61 is constituted with a light emitting material such as metal, a halogen group compound, sulfur, selenium, or the like for forming a plasma to emit light, inactive gases such as argon gas, krypton gas, or the like for forming the plasma in the light emitting portion 61 at the beginning of the light emitting, and a discharge-catalyst material such as mercury for facilitating lighting by supporting an initial discharge or adjusting spectrum of light generated.

Unexplained numeral 80 denotes a reflector, 100 denotes a cooling fan, 110 denotes a second driving motor for rotating the cooling fan 100, and 120 denotes an air duct.

In this embodiment, regarding the related art electrodeless lighting system, upon inputting a driving signal to the high voltage generator 20, the high voltage generator 20 boosts an alternative current (AC) power source and applies the boosted high voltage to the microwave generator 30, which is then oscillated by the high voltage to generate microwaves having an extremely high frequency. The generated microwaves are radiated (emitted) into the resonator 50 via the wave guide 40 and thereby inactive gases filled in the electrodeless bulb 60 are excited. Accordingly, light emitting materials are continuously plasmarized to thus emit light which has a specific discharge spectrum. The emitted light arrives at a surface of the mirror 70 disposed at a rear side of the electrodeless bulb 60 and then is reflected to a front side of the electrodeless bulb 60 thus to light up a space.

An initial lighting of the electrodeless bulb 60 is well executed when power is highly consumed and the electrodeless bulb 60 has a great volume. In the related art middle output electrodeless lighting system, the volume of the electrodeless bulb 60 is decreased in about ⅖ (two-fifths) as compared with a volume of an electrodeless bulb of a high output electrodeless lighting system, which results in decreasing an amount of light emitting materials filled in the electrodeless bulb 60. Accordingly, an electric field is not generated enough to execute the initial lighting of the electrodeless bulb 60. As a result, the initial lighting of the electrodeless bulb 60 is not easy. Additionally, in spite of successful lighting, the lighting state may not be continued until it is stabilized.

SUMMARY OF THE INVENTION

Therefore, an object of the present invention is to provide a middle output electrodeless lighting system capable of generating sufficient electric field required for lighting upon an initial lighting and of stabilizing a state of an electrodeless bulb being lighted.

To achieve these and other advantages and in accordance with the purpose of the present invention, as embodied and broadly described herein, there is provided a middle output electrodeless lighting system comprising: a resonator having a certain inner space and adapted to form a resonance mode by shielding a discharge of microwaves applied therein to the exterior and to allow a discharge of light generated to the exterior; an electrodeless bulb including a light emitting portion positioned in the inner space of the resonator to emit (generate) light upon plasmarizing light emitting materials filled therein by the microwaves applied to the resonator, and a supporting member adapted to support the light emitting portion thus to allow the light emitting portion to be arranged up to a certain height in the inner space of the resonator; and an initial lighting unit disposed at one side of the inner space of the resonator to enhance concentration of microwaves toward the electrodeless bulb so as to stabilize an initial lighting of the electrodeless bulb.

Here, the initial lighting unit is preferably an igniter having a cylindrical body portion, the igniter extended from one side of an inner circumferential surface of the resonator toward a center of the resonator to have a certain length.

Accordingly, it is possible to prevent an arc generation at a position unwanted by a user in case that an outer surface of the igniter is formed to have edges.

The body portion of the igniter preferably has a diameter of 1~5 mm.

Accordingly, it is possible to prevent an arc generation at a position unwanted due to the same effect as the edges aforementioned when the igniter is too thin, and it is also possible to prevent a heat generation on a surface of the igniter when the igniter is thick.

Additionally, the igniter is preferably formed of a metal to be electrically connected to the resonator.

An end portion of the igniter is preferably formed to have a rounded shape.

Accordingly, it is possible to prevent an arc generation at an unwanted position due to edges formed on the surface of the igniter.

Furthermore, a distance between the end portion of the igniter and the supporting member is preferably more than 1 cm.

Accordingly, it is possible to prevent a damage on the electrodeless bulb caused by an arc generated between the end portion of the igniter and the supporting member.

Also, the igniter is preferably installed between a lower surface of the resonator and the light emitting portion.

Accordingly, microwaves are the most applied into the resonator between the lower surface of the resonator and the light emitting portion. Thus, the igniter is installed between the lower surface of the resonator and the light emitting portion to thereby concentrate the microwaves more strongly toward the electrodeless bulb.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
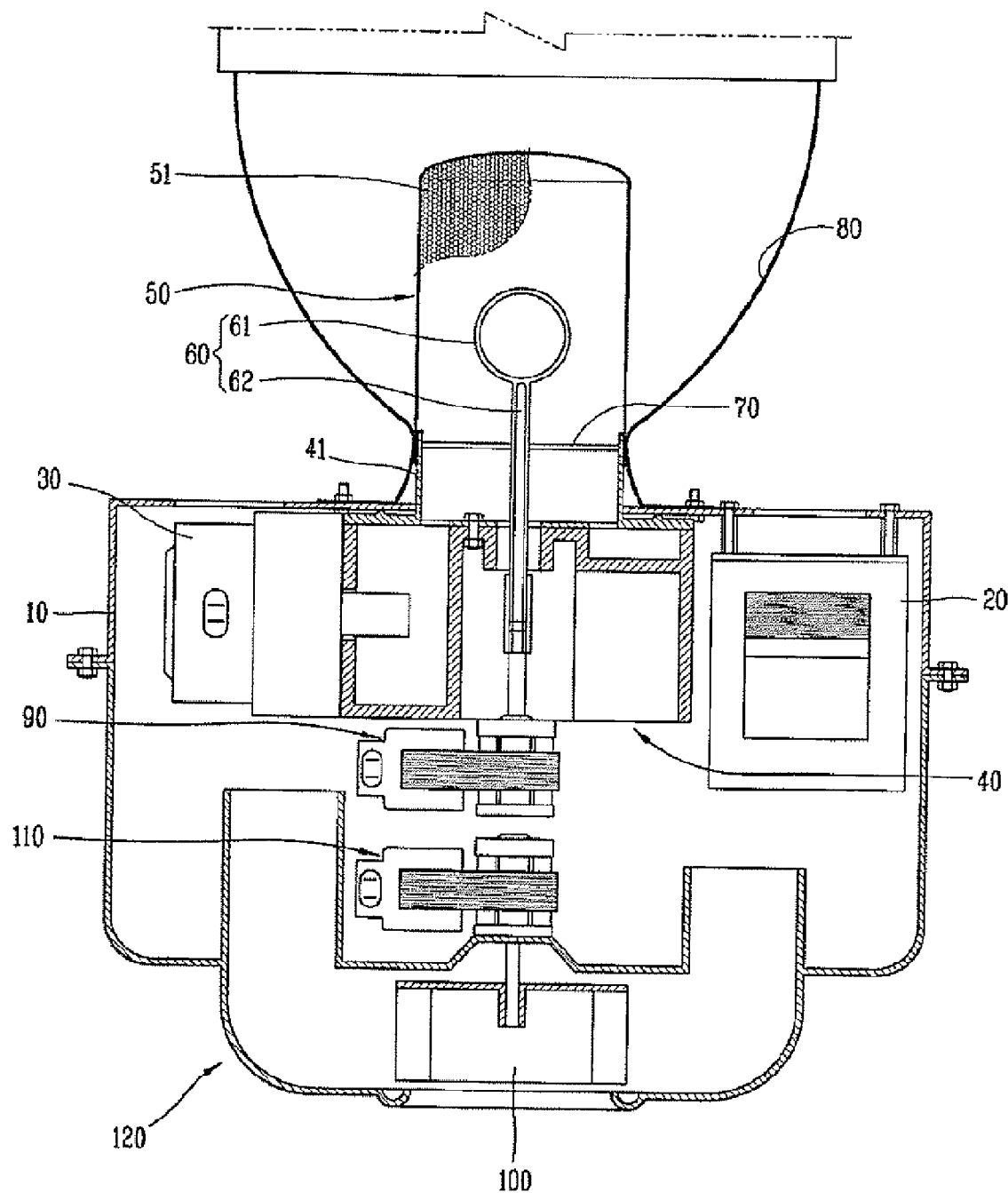
FIG. 1 is a sectional view illustrating a structure of a related art middle output electrode lighting system.
Figure 2:
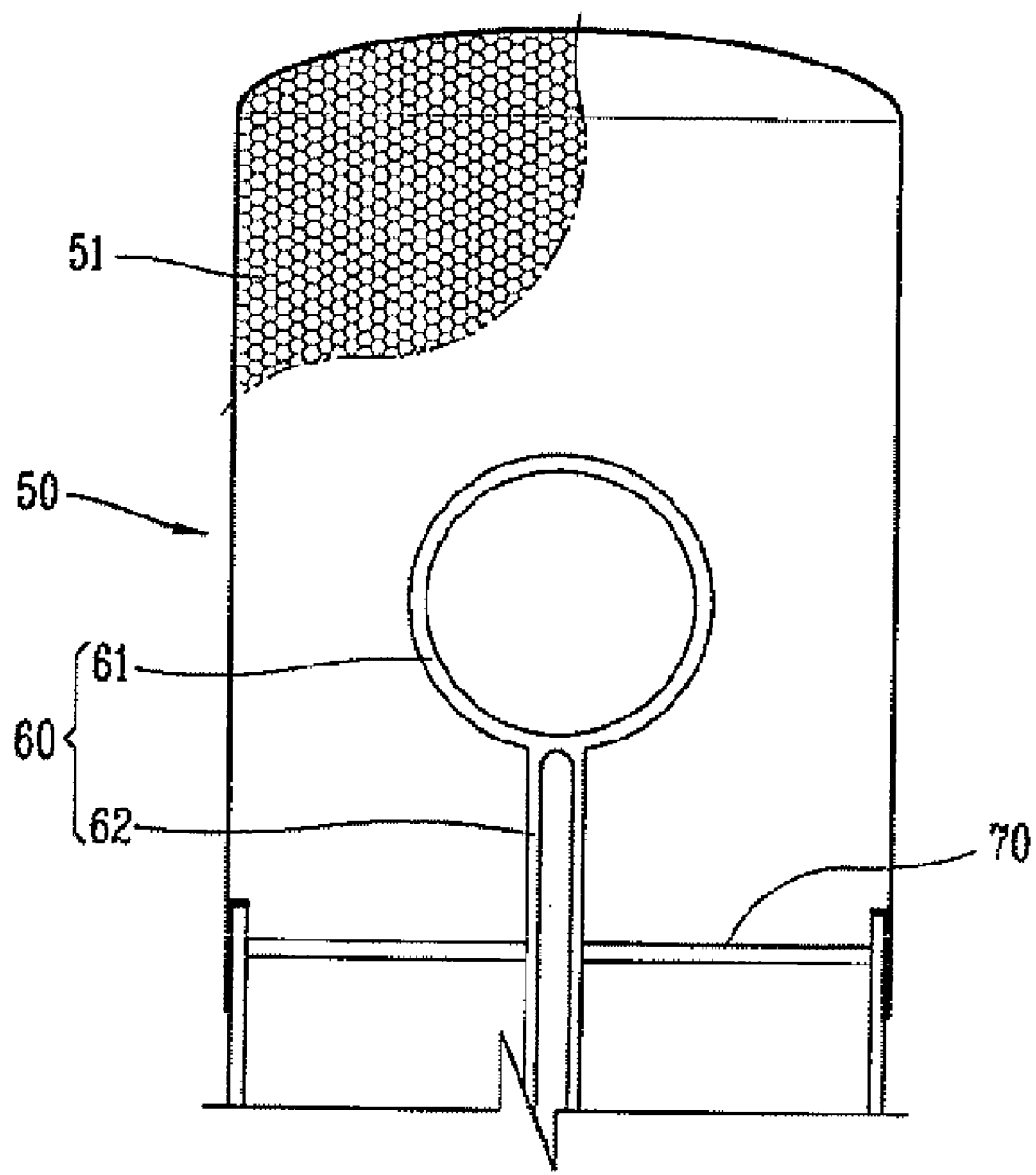
FIG. 2 is a sectional view illustrating a structure in which an electrodeless bulb is disposed in a resonator of FIG. 1.

Description will now be given in detail of the present invention, with reference to the accompanying drawings.

The same portions as those in the related art have the same reference numerals, explanation of which will not be repeated accordingly.

Figure 3:
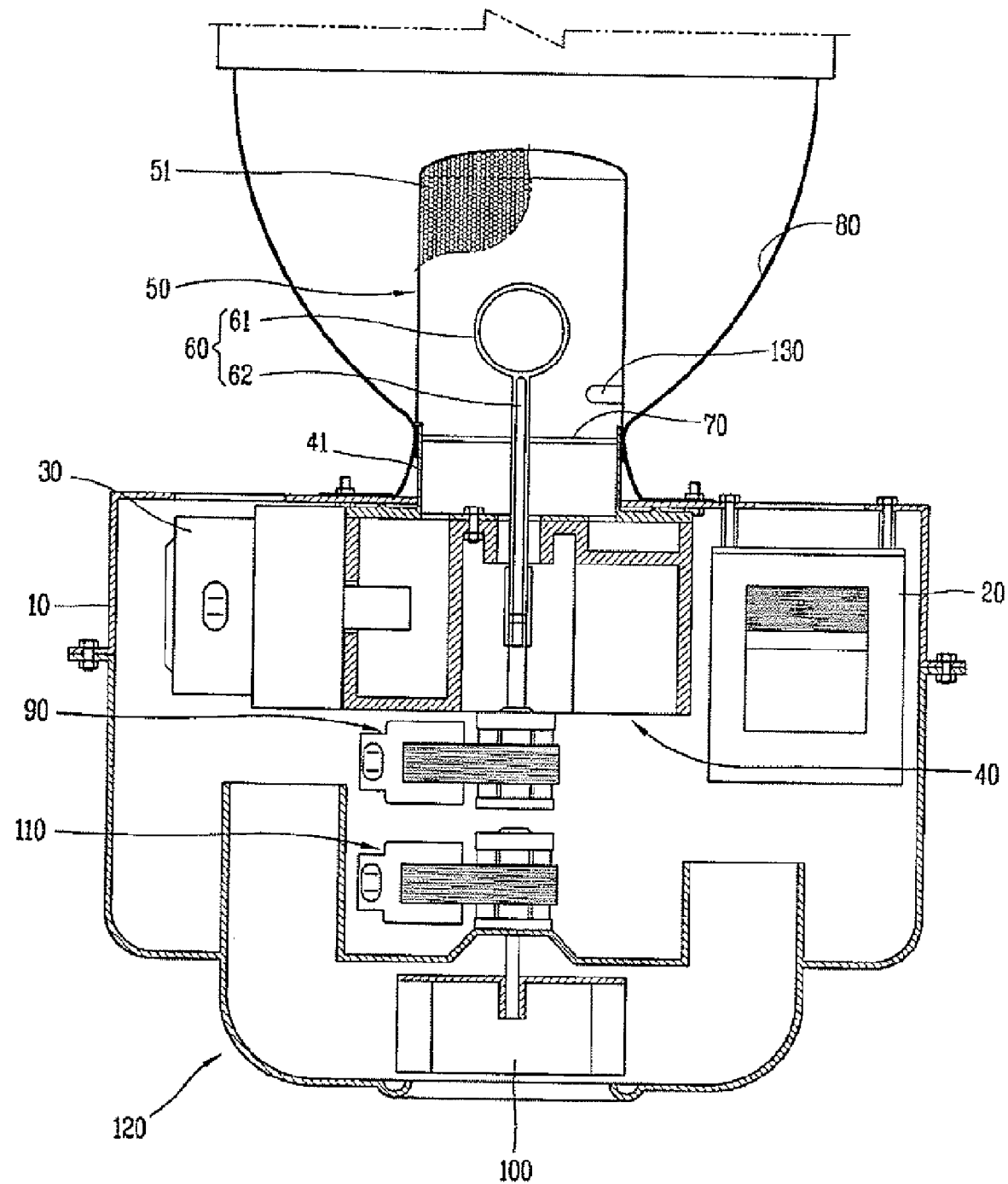
FIG. 3 is a sectional view illustrating a structure of a middle output electrodeless lighting system in accordance with an embodiment of the present invention
Figure 4:
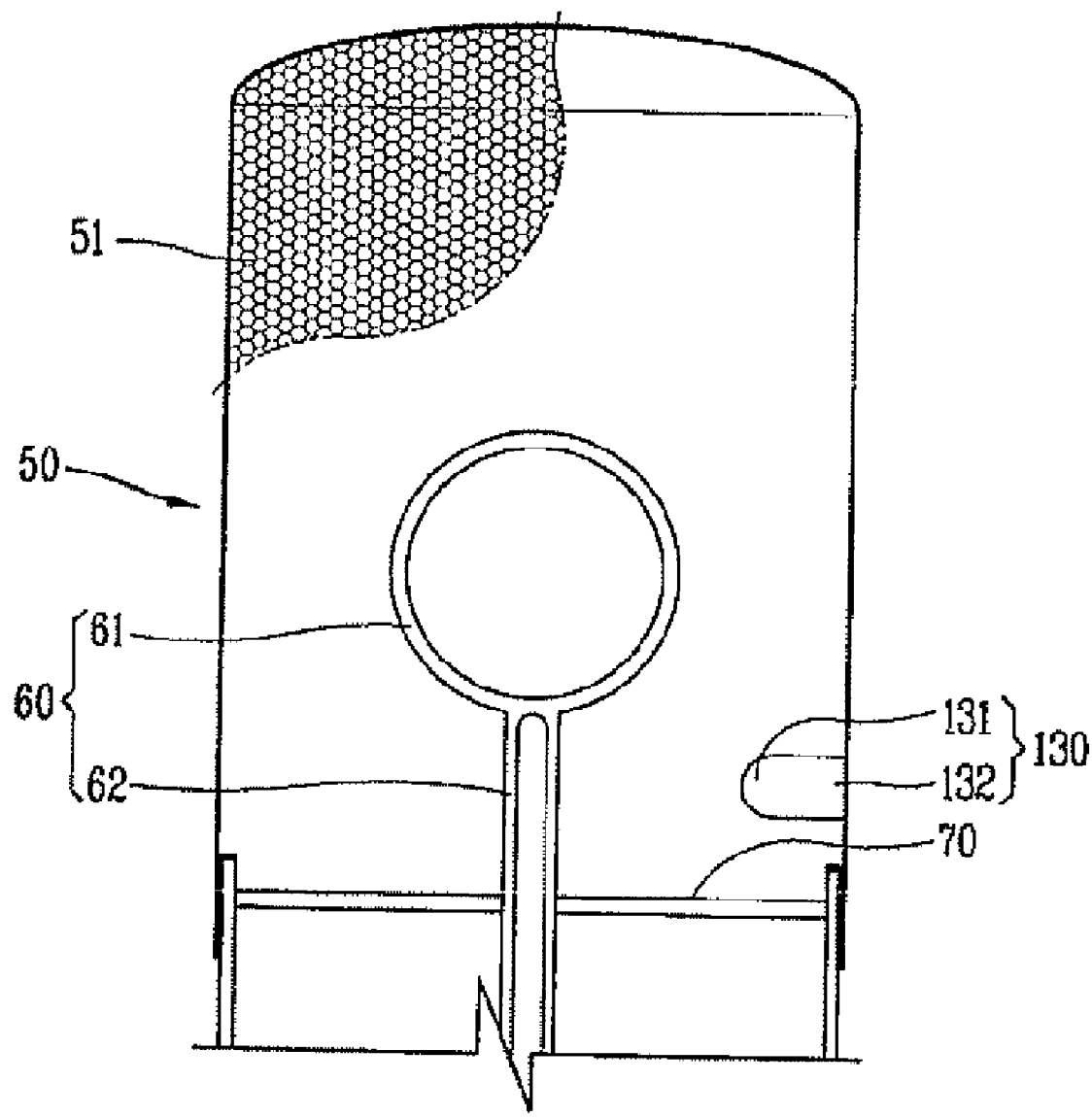
FIG. 4 is a sectional view illustrating a structure in which an igniter is disposed in a resonator of FIG. 3.
Figure 5:
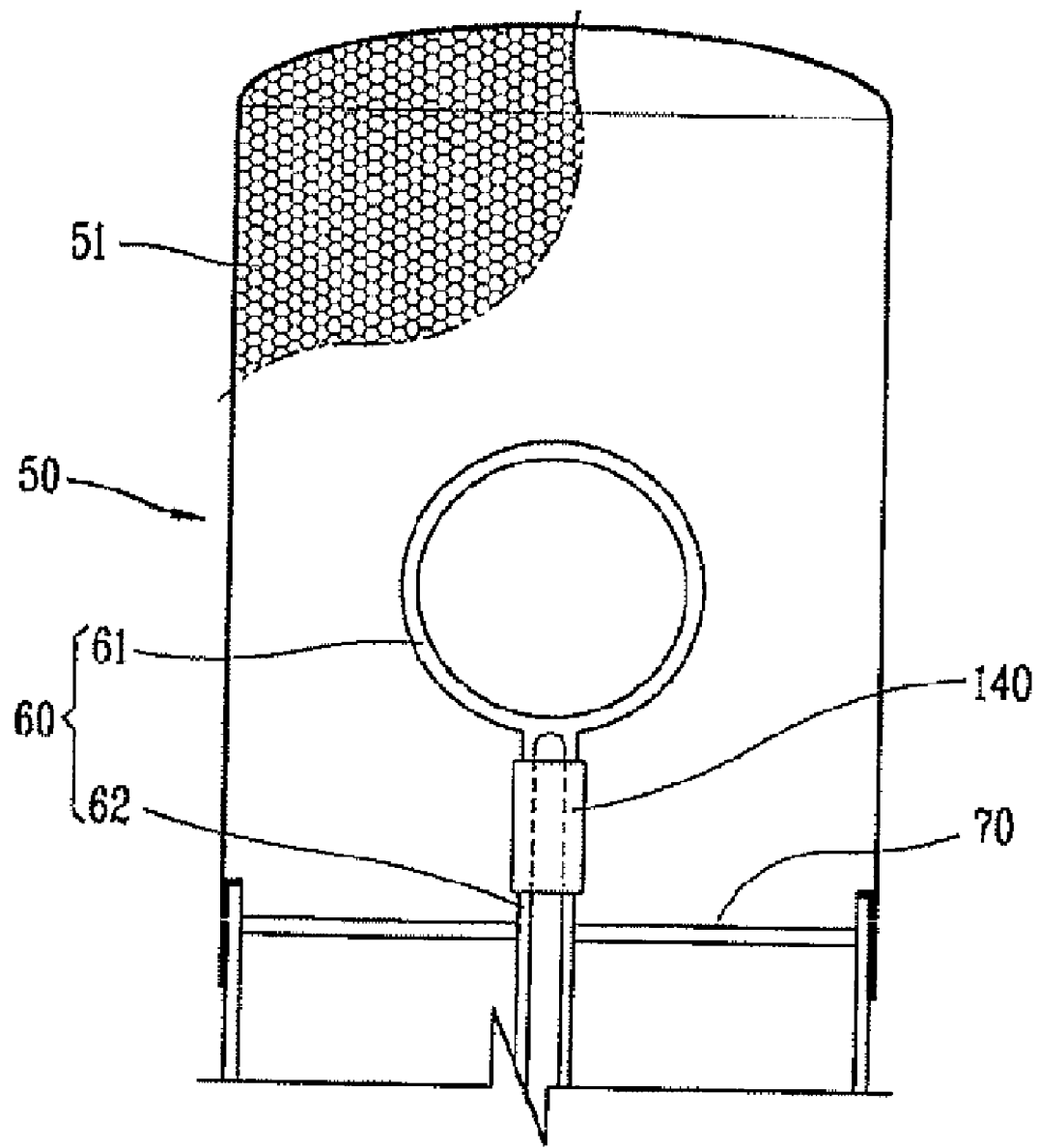
FIG. 5 is a sectional view illustrating a structure of a medial output electrodeless lighting system in accordance with another embodiment of the present invention.

FIG. 3 is a sectional view illustrating a structure of a middle output electrodeless lighting system in accordance with an embodiment of the present invention, FIG. 4 is a sectional view illustrating a structure in which an igniter is disposed in a resonator of FIG. 3, and FIG. 5 is a sectional view illustrating a structure of a medial output electrodeless fighting system in accordance with another embodiment of the present invention.

As illustrated in the drawings, a middle output electrodeless lighting system in accordance with one embodiment of the present invention may comprise a resonator 50 having a certain inner space and adapted to form a resonance mode by shielding a discharge of microwaves applied therein to the exterior and to allow a discharge of light generated to the exterior, an electrodeless bulb 60 including a light emitting portion 61 positioned in the inner space of the resonator 50 to emit (generate) light upon plasmarizing light emitting materials filled therein by the microwaves applied to the resonator 50, and a supporting member 62 adapted to support the light emitting portion 61 thus to allow the light emitting portion 61 to be arranged up to a certain height in the inner space of the resonator 50, and an initial lighting unit disposed at one side of the inner space of the resonator 50 to enhance concentration of microwaves toward the electrodeless bulb 60 so as to stabilize an initial lighting of the electrodeless bulb 60.

The resonator 50 is implemented in a form of a cylindrical mesh having a net-like structure such that the electrodeless bulb 60 is received in its inner space, microwaves are shielded from being discharged to the outside thus to be delivered to the electrodeless bulb 60, and light emitted from the electrodeless bulb 60 is transmitted to the outside. An outer shape of the resonator 50 is formed of a steel material to maintain its cylindrical shape.

A mirror 70 is formed in a circular plate having the same diameter as that of the resonator coupling member 41 and is in contact with an upper end of the resonator coupling member 41. The electrodeless bulb 60 having a certain length is extended from the center portion of the mirror 70 in a height (longitudinal) direction of the wave guide 40 to thus be exposed out of the wave guide 40.

The electrodeless bulb 50, on the other hand, comprises a spherical light emitting portion 61 having a certain inner volume for filling a filling material, and a fixing portion 62 formed of the same material as that of the light emitting portion 61 and extended from the light emitting portion 61.

The light emitting portion 61 is installed inside the resonator 50 and the fixing portion 62 is installed to be formed into the center portion of the wave guide 40. The fixing portion 62 installed is connected to a motor shaft of a driving motor 90 which is installed in the casing 10 thus to be rotated at a certain speed.

The light emitting portion 61 is preferably fabricated using a material such as quartz which has a high optical transmittance and an extremely low dielectric loss. The filling material filled in the light emitting portion 61 is constituted with a light emitting material such as metal, a halogen group compound, sulfur, selenium, or the like for forming a plasma to emit light, inactive gases such as argon gas, krypton gas, or the like for forming the plasma in the light emitting portion 61 at the beginning of the light emitting, and a discharge-catalyst material such as mercury for facilitating lighting by supporting an initial discharge or adjusting spectrum of light generated.

The initial lighting unit is implemented as an igniter 130 extended from one side of an inner circumferential surface of the resonator 50 toward a center of the resonator 50 to have a certain length, and thus having a cylindrical body portion 132 and a curved (rounded) end portion 131.

The igniter 130 is formed of a metal having a high conductivity such as gold, silver, copper, aluminum, or the like to be electrically connected to the resonator 50 The body portion 132 of the igniter 130 is fabricated to have a diameter of 1 mm to 5 mm. The end portion 131 of the igniter 130 and the supporting member 62 of the electrodeless bulb 60 are preferably spaced apart from each other by at least more than 1 cm.

When the diameter of the body portion 132 is less than 1 mm, an arc may be generated on an entire surface of the body portion 132 other than the end portion 131 of the igniter 130. Also, when the diameter of the igniter 130 is more than 5 mm, heat is generated on the surface of the igniter 130.

Furthermore, if a distance between the end portion 131 of the igniter 130 and the supporting member 62 is less than 1 cm, spark may be generated between the end portion 131 of the igniter 130 and the supporting member 62, which may damage the electrodeless bulb 60.

In this embodiment, upon inputting a driving signal to the high voltage generator 20, the high voltage generator 20 boosts an alternative current (AC) power source and applies the boosted high voltage to the microwave generator 30, which is then oscillated by the high voltage to generate microwaves having an extremely high frequency. The generated microwaves are radiated (emitted) into the resonator 50 via the wave guide 40 to be applied toward the electrodeless bulb 60. The microwaves allow inactive gases filled in the electrodeless bulb 60 to be excited more fast. Accordingly, the light emitting materials are continuously converted into a plasma state to thereby generate (emit) light which has a specific discharge spectrum. The emitted light arrives at a surface of the mirror 70 disposed at a rear side of the electrodeless bulb 60 and then reflected to a front side of the electrodeless bulb 60 thus to light up a space. Here, the igniter 30 allows the microwaves (microwave energy) to be applied to the light emitting portion 61 more strongly, which results in easily performing the initial lighting and continuously plasmarizing the light emitting materials to thus generate more stabilized light.

FIG. 5 is a sectional view illustrating a structure of a middle output electrodeless lighting system in accordance with another embodiment of the present invention The same portions as those in the one embodiment of the present invention have the same reference numerals, detailed explanation of which will thusly be omitted.

As described above, regarding the middle output electrodeless lighting system in accordance with the another embodiment of the present invention, an initial lighting unit 140 is extendedly formed in a height direction of the supporting member 62 to have a certain length and wound on an outer circumferential surface of the supporting member 62. Accordingly, it is not necessary to fix a separate igniter 130 to an inner circumferential surface of the resonator 50 upon the fabrication of the electrodeless lighting system. Hence, the operations and effects in this embodiment are the same as in the one embodiment aforementioned.

As described so far, in the present invention, the middle output electrodeless lighting system is provided such that electric field required for lighting can sufficiently be generated upon the initial lighting, and simultaneously the state of the electrodeless bulb being lighted can be stabilized.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A middle output electrodeless lighting system: comprising:
   a resonator having an inner space, wherein microwares are supplied to the inner space of the resonator and the resonator is configured to provide a resonance mode by shielding a discharge of the microwaves to an exterior of the inner space of the resonator, and wherein light generated by an electrodeless bulb is discharged to the exterior of the inner space of the resonator;
   the electrodeless bulb comprising a light emitting portion positioned within the inner space of the resonator to emit or generate light by plasmarizing light emitting materials, provided within the light emitting portion, with the microwaves supplied to the resonator, and a support which supports the light emitting portion such that the light emitting portion is positioned at a predetermined height within the inner space of the resonator;
   a mirror positioned at a rear side of the electrodeless bulb, wherein the support penetrates the mirror such that light emitted from the light emitting portion is reflected to a front side of the electrodeless bulb; and
   an initial lighting unit positioned at one side of the inner space of the resonator, wherein the initial lighting unit is positioned between a rear side of the light emitting portion of the electrodeless bulb and the mirror to enhance concentration of microwaves toward the electrodeless bulb such that an initial lighting of the electrodeless bulb is stabilized, wherein the initial lighting unit comprises an igniter having a cylindrical body portion, and wherein the igniter extends from one side of an inner circumferential surface of the resonator toward a center of the resonator so as to define a length of the initial lighting unit.

2. The electrodeless lighting system of claim 1, wherein the body portion of the igniter has a diameter of 1-5 mm.

3. The electrodeless lighting system of claim 1, wherein the igniter comprises a metal configured to be electrically connected to the resonator.

4. The electrodeless lighting system of claim 1, wherein an end portion of the igniter has a rounded shape.

5. The electrodeless lighting system of claim 1, wherein the end portion of the igniter is spaced apart from the support so as to define a predetermined distance.

6. The electrodeless lighting system of claim 5, wherein the predetermined distance is more than 1 cm.

7. The electrodeless lighting system of claim 6, wherein the igniter is positioned between an inlet portion of the resonator and the light emitting portion of the electrodeless bulb.

8. A middle output electrodeless lighting system comprising:
- a resonator having an inner space, wherein microwares are supplied to the inner space of the resonator and the resonator is configured to provide a resonance mode by shielding a discharge of the microwaves to an exterior of the inner space of the resonator, and wherein light generated by an electrodeless bulb is discharged to the exterior of the inner space of the resonator;
- the electrodeless bulb comprising a light emitting portion positioned within the inner space of the resonator to emit or generate light by plasmarizing light emitting materials, provided within the light emitting portion, with the microwaves supplied to the resonator, and a support which supports the light emitting portion such that the light emitting portion is positioned at a predetermined height within the inner space of the resonator;
- a mirror positioned at a rear end of the electrodeless bulb, wherein the support penetrates the mirror such that light emitted from the light emitting portion is reflected to a front side of the electrodeless bulb; and
- a cylindrical initial lighting unit comprising metal, the cylindrical initial lighting unit extending in a height direction of the support so as to define a length to facilitate an initial lighting of the electrodeless bulb, wherein the cylindrical initial lighting unit is wound on an outer circumferential surface of the support, and wherein the cylindrical initial lighting unit is positioned between an inlet portion of the resonator and the light emitting portion of the electrodeless bulb.

* * * * *